United States Patent
Munoz et al.

(10) Patent No.: US 6,817,575 B1
(45) Date of Patent: Nov. 16, 2004

(54) INTEGRATED SYSTEM FOR PROVIDING AIRCRAFT ENVIRONMENTAL CONTROL

(75) Inventors: Jules Ricardo Munoz, South Windsor, CT (US); Luca Bertuccioli, East Longmeadow, MA (US); Michael K. Sahm, Avon, CT (US); Jay Fletcher, Marlborough, CT (US); Charles E. Lents, Amston, CT (US); Steven E. Squier, Rockford, IL (US); Richard Welch, Rockford, IL (US); Arthur Curtis Becker, Andover, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/251,721

(22) Filed: Sep. 20, 2002

Related U.S. Application Data

(60) Provisional application No. 60/323,831, filed on Sep. 20, 2001.

(51) Int. Cl.[7] .............................................. B64D 13/08
(52) U.S. Cl. ...................... 244/118.5; 60/39.07; 454/76
(58) Field of Search ................. 244/118.5, 58, 244/53 R; 60/39.02, 39.07, 39.142, 39.141, 730, 736, 266; 454/69–76, 141; 165/41, 44

(56) References Cited

U.S. PATENT DOCUMENTS

| | | | | |
|---|---|---|---|---|
| 4,482,114 A | * | 11/1984 | Gupta et al. ............. | 244/118.5 |
| 4,503,666 A | * | 3/1985 | Christoff .................... | 60/39.07 |
| 5,143,329 A | * | 9/1992 | Coffingerry .............. | 244/118.5 |
| 5,442,905 A | * | 8/1995 | Claeys et al. .............. | 60/39.07 |
| 5,813,630 A | * | 9/1998 | Williams ................. | 244/118.5 |
| 5,911,388 A | * | 6/1999 | Severson et al. ........ | 244/118.5 |
| 5,967,461 A | * | 10/1999 | Farrington ............... | 244/118.5 |
| 6,050,080 A | * | 4/2000 | Horner ..................... | 60/39.07 |
| 6,182,435 B1 | * | 2/2001 | Niggemann et al. ....... | 60/39.07 |
| 6,305,156 B1 | * | 10/2001 | Lui ........................... | 60/39.07 |
| 6,415,595 B1 | * | 7/2002 | Wilmot, Jr. et al. ....... | 60/39.07 |
| 6,450,447 B1 | * | 9/2002 | Konrad et al. ........... | 244/53 R |

* cited by examiner

*Primary Examiner*—Galen Barefoot
(74) *Attorney, Agent, or Firm*—Bachman & LaPointe, P.C.

(57) ABSTRACT

The present invention relates to an integrated enviromental control system for an aircraft. The system uses bleed air from a propulsion engine to drive an air turbine which provides power to at least one aircraft component such as an aircraft mounted accessory drive. The system uses the bleed air exiting the air turbine as an air source for the cabin and/or flight deck enviromental control system.

12 Claims, 2 Drawing Sheets

INTEGRATED SYSTEM FOR PROVIDING AIRCRAFT ENVIRONMENTAL CONTROL

CROSS REFERENCE TO RELATED APPLICATION(S)

This application claims the benefit of U.S. Provisional Patent Application No. 60/323,831, entitled INTEGRATED SYSTEM FOR PROVIDING AIRCRAFT ENVIRONMENTAL CONTROL, filed Sep. 20, 2001.

BACKGROUND OF THE INVENTION

The present invention relates to an integrated system for providing environmental control and power to onboard aircraft systems.

Current aircraft power systems are comprised of several major components such as the engine, the environmental control system, and the thermal management system. Typically, these subsystems are designed relatively independently of one another with power being transferred from one subsystem to another in certain predefined ways.

All manned aircraft have an environmental control system to supply cooled pressurized air to the cabin and/or flight deck. This is typically accomplished by the use of an air cycle machine. FIG. 1 illustrates a typical environmental control system 10 for an aircraft. Depending upon the mission point, bleed air from the engine 12 is removed from either the mid- or high-pressure stages of the high compressor 14. The bleed air is first cooled by ram air in a primary heat exchanger. The bleed air is then further compressed in the compressor section 16 of the air cycle machine. Additional cooling of the bleed air is performed in a secondary heat exchanger 18 again using ram air as the coolant. The bleed air is then expanded to the desired pressure across the turbine section 20 of the air cycle machine. The expansion process produces the necessary work required to drive the compressor 16 via a shaft 22 and significantly drops the temperature of the bleed air. The cooled bleed air exiting the turbine section 20 is mixed with cabin recirculation air to maintain the temperature of the air entering the cabin at a given level.

One of the deficiencies of this type of system is the penalties which it creates with respect to engine losses. The bleed air used for this system could be as much as 5% of the core flow from the engine. Other deficiencies include the weight which is added as a result of having to provide one or more heat exchangers. Still further, the system does not address the issue of providing power to or thermally managing other aircraft components.

SUMMARY OF THE INVENTION

Accordingly, it is an object of the present invention to provide an integrated environmental control system for an aircraft.

It is yet another object of the present invention to provide a system as above which provides cooling to other aircraft components besides the cabin and/or flight deck.

It is still another object of the present invention to provide a system as above which provides power to aircraft components.

The foregoing objects are attained by the integrated environmental control system of the present invention.

In accordance with the present invention, the integrated environmental control system for an aircraft having at least one propulsion engine is provided. The integrated environmental control system broadly comprises means for using engine bleed air to provide power to at least one aircraft component and to provide cooling to the flight deck and/or cabin.

Further, in accordance with the present invention, a method for providing environmental control to an aircraft is provided. The method broadly comprises the steps of bleeding air from an engine, delivering the bleed air to an inlet of a turbine, using the turbine to provide power to an aircraft mounted accessory drive, and cooling bleed air exiting the turbine and delivering the cooled bleed air to at least one of a flight deck and a cabin.

Other details of the integrated environmental control system of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
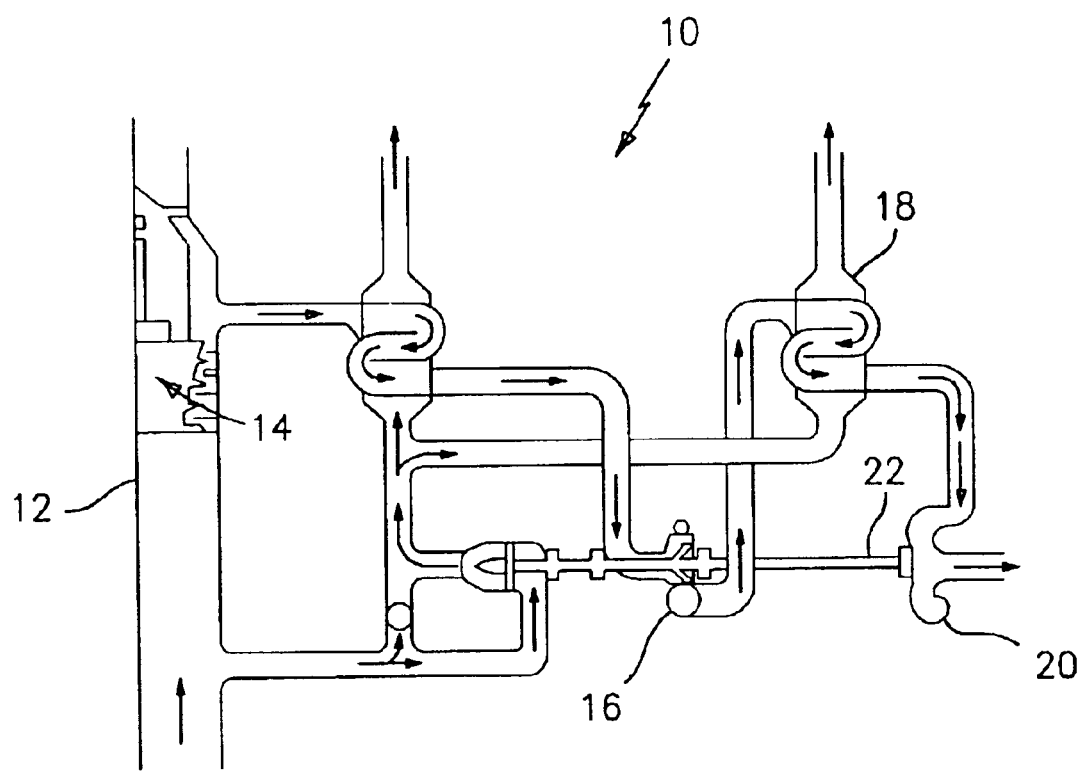
FIG. 1 is a schematic representation of a prior art environmental control system for an aircraft.
Figure 2:
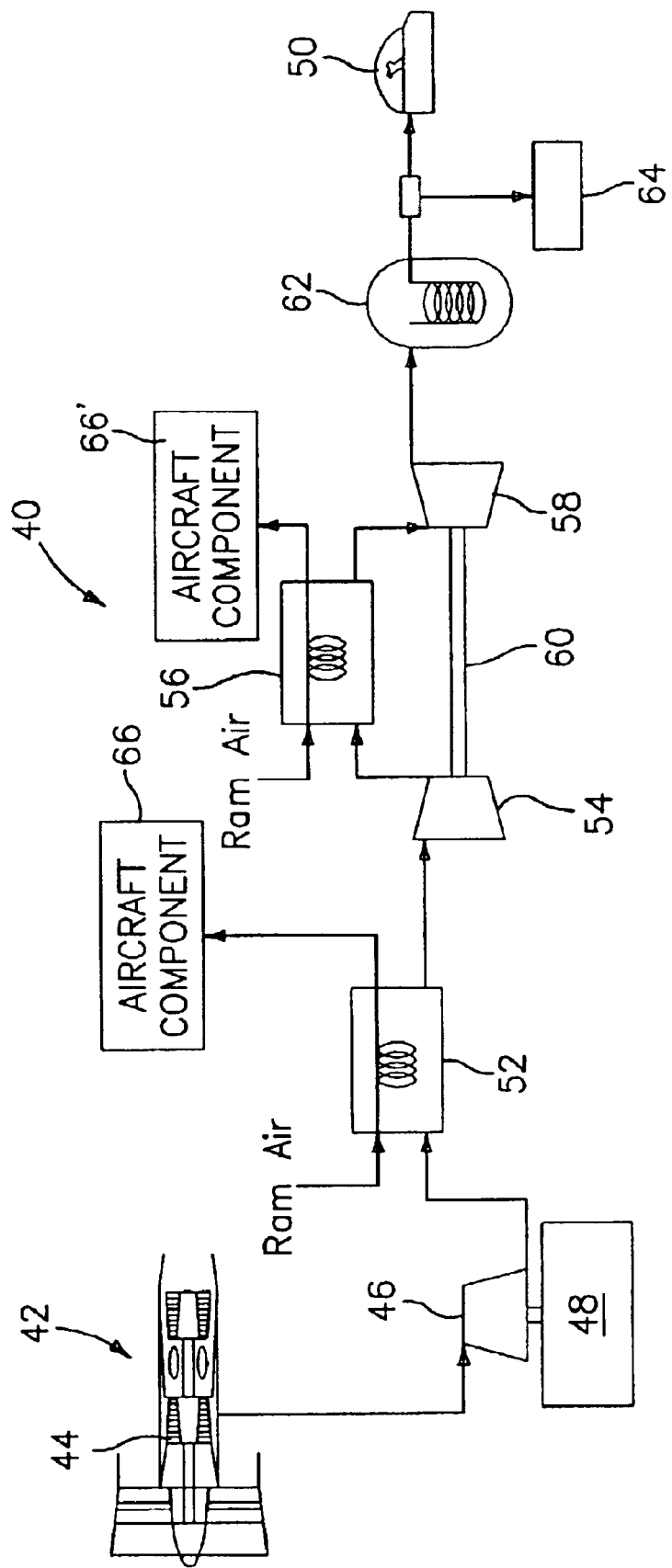
FIG. 2 is a schematic representation of an integrated environmental control system in accordance with the present invention.

Referring now to FIG. 2, an integrated environmental control system 40 in accordance with the present invention is illustrated. As can be seen from this figure, the system 40 uses bleed air from a propulsion engine 42 onboard the aircraft. Typically, the bleed air will be taken from the high-pressure stage of an engine compressor 44 so that the bleed air is characterized by high pressure, high temperature, and high enthalpy.

The engine bleed air is supplied to the inlet side of an air turbine 46 which is preferably positioned close to the engine 42. Since the bleed air comes from the high pressure stage of the compressor and is preferentially delivered at high temperature, a smaller turbine 46 can be used than would be normally required. The air turbine 46 is connected to an aircraft mounted accessory drive 48 which drives one or more generators, one or more pumps, and one or more onboard lubrication systems (not shown). The engine bleed air is used to cause the turbine 46 to rotate and provide shaft power to the aircraft mounted accessory drive 48.

The bleed air exiting the turbine 46 is used as an air source for providing cooled air to the aircraft's flight deck and/or cabin 50. As can be seen from FIG. 2, the bleed air exiting the turbine is supplied to a precooler 52. Also supplied to the precooler 52 is ram air. In the precooler 52, the temperature of the bleed air is lowered by transferring heat from the hot bleed air to the cooler ram air.

From the precooler 52, the bleed air is supplied to the inlet side of a compressor 54. In the compressor 54, the pressure and the temperature of the bleed air are increased to raise the energy level of the bleed air. After being compressed, the bleed air is supplied to a secondary cooler 56 where the temperature of the bleed air is again lowered. Cool ram air is supplied to the cooler 56 to reduce the temperature of the bleed air.

The cooled bleed air is then supplied to the inlet side of a turbine 58 so that its energy can be used to generated shaft power for driving the compressor 54 via shaft 60. In the turbine 58, the bleed air is expanded and its temperature is further reduced.

The bleed air is then supplied to a water separator 62 where moisture in the bleed air is removed. The cooled dry bleed air is then supplied to the flight deck and/or cabin 50. If desired, a portion of the cooled dry bleed air may be used to cool the avionics 64 onboard the aircraft. Depending on the environmental needs for the flight deck and/or cabin 50, the cooled dry bleed air may be mixed with air recirculated from the flight deck and/or cabin 50. Any suitable means known in the art such as a mixing valve may be provided to mix the cool dry bleed air with the recirculated air.

The ram air which is used in the precooler 52 and the secondary cooler 56 and then exhausted may be used to cool or ventilate aircraft components 66 or 66' such as one or more generators and/or other aircraft enclosures.

Depending on the environmental needs of a particular aircraft, the precooler 52 may be omitted. In such a system, the bleed air exiting the turbine 46 is supplied directly to the compressor 54.

If desired, the water separator 62 may be omitted if a condenser/reheater assembly (not shown) is used in the system.

It is apparent that there has been provided in accordance with the present invention an integrated environmental control system for an aircraft which fully satisfies the objects, means, and advantages set forth hereinbefore. While the present invention has been described in the context of specific embodiments thereof, other alternatives, modifications, and variations will become apparent to those skilled in the art having read the foregoing description. Accordingly, it is intended to embrace those alternatives, modifications, and variations that fall within the broad scope of the appended claims.

What is claimed is:

1. An integrated environmental control system for an aircraft comprising:
   means for using engine bleed air to provide power to at least one aircraft component and to provide cooling to at least one of a flight deck and a cabin;
   said bleed air using means comprising an aircraft mounted accessory drive, a turbine connected to said aircraft mounted accessory drive for providing power to said aircraft mounted accessory drive, and means for delivering said engine bleed air to an inlet of said turbine;
   means for delivering bleed air exiting said turbine to means for cooling said bleed air and delivering said cooled bleed air to said at least one of a flight deck and a cabin; and
   said delivering and cooling means comprising a first means for cooling said bleed air exiting said turbine, a compressor for increasing the pressure and temperature of said cooled bleed air exiting said first cooling means, a second cooling means for lowering the temperature of the pressurized bleed air exiting said compressor and an expansion turbine for generating shaft power for driving said compressor, said expansion turbine receiving said cooled pressurized bleed air from said second cooling means.

2. An integrated environmental control system according to claim 1, wherein said engine bleed air delivering means comprises means for delivering bleed air from a high pressure compressor stage.

3. An integrated environmental control system according to claim 1, wherein said first and second cooling means utilize ram air as a heat sink and wherein ram air from said first and second cooling means is delivered to cool aircraft components.

4. An integrated environmental control system according to claim 1, further comprising means for removing moisture from the cooled pressurized bleed air exiting said expansion turbine.

5. An integrated environmental control system according to claim 1, further comprising means for delivering a portion of said cooled bleed air to an avionics deck.

6. A method for providing environmental control for an aircraft comprising the steps of:
   bleeding air from an engine;
   delivering said bleed air to an inlet of a turbine;
   using said turbine to deliver power to an aircraft mounted accessory drive;
   cooling bleed air exiting said turbine and delivering said cooled bleed air to at least one of a flight deck and a cabin; and
   said bleed air cooling step comprises supplying said bleed air to an inlet of a compressor to increase the pressure and temperature of said bleed air and delivering said bleed air at said increased pressure and temperature to an inlet of an expansion turbine for driving a shaft to which said compressor is connected and to drop the temperature of said bleed air.

7. A method according to claim 6, wherein said air bleeding step comprises bleeding air from a high pressure compressor stage of said engine.

8. A method according to claim 6, wherein said bleed air cooling step further comprises passing said bleed air through a first cooling means using ram air as a heat sink prior to delivering said bleed air to said compressor inlet.

9. A method according to claim 8, wherein said bleed air cooling step further comprises passing said bleed air exiting said compressor through a second cooling means using ram air as a heat sink prior to delivering said bleed air to said expansion turbine.

10. A method according to claim 9, further comprising using said ram air exiting said first and second cooling means to cool at least one aircraft component.

11. A method according to claim 9, further comprising removing moisture from said cooled bleed air exiting said expansion turbine.

12. A method according to claim 6, further comprising delivering a portion of said cooled bleed air to an avionics deck for cooling avionics onboard said aircraft.

* * * * *